United States Patent
Danielson et al.

(10) Patent No.: US 10,876,775 B2
(45) Date of Patent: Dec. 29, 2020

(54) HIGH FLOW SERVICE CONNECTION VALVE

(71) Applicant: FasTest, Inc., Roseville, MN (US)

(72) Inventors: Robert Danielson, Roseville, MN (US); Allen Wagenius, Roseville, MN (US); Stanlee Meisinger, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 48 days.

(21) Appl. No.: 16/359,606

(22) Filed: Mar. 20, 2019

(65) Prior Publication Data

US 2019/0293330 A1 Sep. 26, 2019

Related U.S. Application Data

(60) Provisional application No. 62/646,006, filed on Mar. 21, 2018.

(51) Int. Cl.
*F16K 15/06* (2006.01)
*F16K 15/18* (2006.01)
(Continued)

(52) U.S. Cl.
CPC ............ *F25B 45/00* (2013.01); *F16K 1/12* (2013.01); *F16K 1/46* (2013.01); *F16K 15/063* (2013.01);
(Continued)

(58) Field of Classification Search
CPC ...... F25B 45/00; F25B 41/003; F25B 41/062; F25B 2345/001; F25B 2345/002; F25B 2345/006; F25B 2500/05; F16K 1/12; F16K 1/36; F16K 1/38; F16K 1/46; F16K 1/50; F16K 15/025; F16K 15/026; F16K 15/063; F16K 15/18; F16K 27/02; F16K 27/0209; F16L 37/28; F16L 37/30; F16L 37/32;
(Continued)

(56) References Cited

U.S. PATENT DOCUMENTS 695,378 A * 3/1902 Cowels ................ F16K 15/026
137/543.23
1,695,722 A * 12/1928 Smith ................... F16K 15/026
137/541
(Continued)

FOREIGN PATENT DOCUMENTS

JP 2001-248740 9/2001

OTHER PUBLICATIONS

International Search Report and Written Opinion, issued in the corresponding PCT application No. PCT/IB2019/052283, dated Aug. 1, 2019, 10 pages.

*Primary Examiner* — David Colon-Morales
(74) *Attorney, Agent, or Firm* — Hamre, Schumann, Mueller & Larson, P.C.

(57) ABSTRACT

A service connection valve that is configured for use on air conditioning and refrigeration units. The valve includes a pin guide that is separate from the poppet assembly and installed in the valve body prior to installation of the poppet assembly. In addition, the pin guide can be disposed in a large diameter flow passageway of the valve body. Further, the poppet assembly includes a seal that expands in diameter upon installing the poppet assembly into the valve body. The service connection valve provides high flow rates during charging and evacuation operations.

7 Claims, 14 Drawing Sheets

(51) Int. Cl.
  *F16K 27/02* (2006.01)
  *F16K 1/12* (2006.01)
  *F16K 1/46* (2006.01)
  *F25B 45/00* (2006.01)
  *F25B 41/00* (2006.01)

(52) U.S. Cl.
  CPC .............. *F16K 15/18* (2013.01); *F16K 27/02* (2013.01); *F25B 41/003* (2013.01); *F25B 2345/006* (2013.01)

(58) Field of Classification Search
  CPC ..... F16L 37/38; F16L 37/40; Y10T 137/7935; Y10T 137/7937
  USPC ...................................................... 251/149.6
  See application file for complete search history.

(56) References Cited

U.S. PATENT DOCUMENTS

| | | | | |
|---|---|---|---|---|
| 1,710,635 | A * | 4/1929 | Wertz | F16K 15/026 137/543.19 |
| 2,417,494 | A * | 3/1947 | Hoof | F16K 1/34 251/332 |
| 2,596,419 | A * | 5/1952 | Lowe | F16K 31/508 251/272 |
| 2,678,187 | A * | 5/1954 | Peters | F16K 1/46 251/357 |
| 2,822,817 | A * | 2/1958 | Benzel | F16K 15/063 137/223 |
| 3,336,936 | A * | 8/1967 | Mullins | F25B 45/00 137/234.5 |
| 3,439,697 | A * | 4/1969 | Blanchette | F16K 15/026 137/115.13 |
| 3,714,959 | A * | 2/1973 | Pignataro, Jr. | F16L 41/045 137/318 |
| 3,715,099 | A * | 2/1973 | Shendure | F16L 37/40 251/149.1 |
| 3,729,023 | A * | 4/1973 | Hammond | F16L 37/30 137/614.03 |
| 3,815,624 | A * | 6/1974 | Mullins | F25B 45/00 137/318 |
| 3,851,666 | A * | 12/1974 | Hammond | F16L 37/248 137/614.04 |
| 3,901,268 | A * | 8/1975 | Mullins | F16L 41/045 137/318 |
| 4,182,370 | A * | 1/1980 | Karcher | F16L 37/23 137/231 |
| 4,257,443 | A * | 3/1981 | Turney | F16K 15/063 137/269.5 |
| 5,174,327 | A * | 12/1992 | Truax | A62C 35/68 137/469 |
| 5,653,256 | A * | 8/1997 | Myers | F16K 15/063 137/234.5 |
| 6,041,818 | A * | 3/2000 | Schadewald | F16L 37/28 137/614.05 |
| 6,050,295 | A | 4/2000 | Meisinger et al. | |
| 6,269,840 | B1 * | 8/2001 | Beaver | B60H 1/00485 137/596.2 |
| 6,719,003 | B2 * | 4/2004 | Schroeder | F16K 15/063 137/234.5 |
| 6,901,947 | B2 | 6/2005 | Danielson et al. | |
| 8,695,642 | B2 | 4/2014 | Danielson et al. | |
| 10,113,657 | B2 * | 10/2018 | Prescott | F16K 15/18 |
| 2002/0066487 | A1 | 6/2002 | Danielson et al. | |
| 2002/0079473 | A1 * | 6/2002 | Jeory | F16L 37/28 251/149.6 |
| 2003/0116199 | A1 | 6/2003 | Schroeder et al. | |
| 2007/0235092 | A1 | 10/2007 | Danielson et al. | |
| 2017/0368903 | A1 | 12/2017 | Kesler et al. | |

* cited by examiner

HIGH FLOW SERVICE CONNECTION VALVE

FIELD

This technical disclosure relates to service connection valves used on air conditioning and refrigeration units.

BACKGROUND

U.S. Pat. Nos. 6,050,295 and 6,901,947, and U.S. Patent Application Publication No. 2002/066487, disclose examples of service connection valves that can be used on air conditioning and refrigeration units and that provide a high rate of flow through the service connection valve during servicing.

SUMMARY

Service connection valves are described herein that are configured for use on air conditioning and refrigeration units. The service connection valves described herein provide high flow rates during charging and evacuation operations, and are less expensive to manufacture.

In one embodiment, the service connection valve has a one or single piece valve body. This eliminates the need for a metal-to-metal seal as required in the two-piece bodies of the service connection valves described in U.S. Pat. Nos. 6,050,295 and 6,901,947, and U.S. Patent Application Publication No. 2002/066487. However, the one or single piece valve body can be used with the same processing equipment used with the two-piece bodies of the service connection valves described in U.S. Pat. Nos. 6,050,295 and 6,901,947, and U.S. Patent Application Publication No. 2002/066487.

In another embodiment, the service connection valve includes a poppet assembly with a pin and an o-ring seal, where the poppet assembly is detachably fixed to a pin guide that is internal to the service connection valve. In contrast, in conventional service connection valves, the pin, pin guide and o-ring are assembled and removable as a unit into and from the service connection valve. During use of the service connection valve described herein, the pin guide moves with the poppet assembly as the poppet assembly moves between an open and a closed position.

In another embodiment, the o-ring seal of the poppet valve assembly is designed to expand during installation into the service connection valve to create the sealing characteristics of the o-ring seal. For example, the o-ring seal can be initially disposed in a first small diameter channel of the pin. As the poppet assembly is being installed, the o-ring seal is forced into a second larger diameter channel of the pin, thereby expanding the diameter of the o-ring seal for sealing within the service connection valve.

In still another embodiment, the pin guide is disposed within a larger diameter flow passage of the valve body. This position of the pin guide allows for higher flow rates through the service connection valve.

In another embodiment, a service connection valve disclosed herein includes a generally cylindrical valve body having a first end, a second end, an exterior surface, and a flow passageway extending centrally and longitudinally through the valve body from the first end to the second end. The flow passageway has a first portion and a second portion, with the first portion extending from the first end toward the second end. The first portion has a first diameter, while the second portion has a second diameter that is larger than the first diameter. A pin guide is disposed within the second portion of the flow passageway, and the pin guide is non-rotationally movable relative to the valve body in a longitudinal direction. Threads are formed on the exterior surface of the valve body, with the threads surrounding the first portion and the threads are positioned closer to the first end than to the second end. In addition, a hex head is formed on the exterior surface of the valve body between the threads and the second end.

In another embodiment, a service connection valve disclosed herein includes a generally cylindrical valve body having a first end, a second end, an exterior surface, and a flow passageway extending centrally and longitudinally through the valve body from the first end to the second end. A pin guide is disposed within the flow passageway, and a poppet assembly is detachably connected to the pin guide. The poppet assembly includes a pin having a first end and a second end and an o-ring seal surrounding the pin between the first end of the pin and the second end of the pin, with the pin having threads that detachably connect the pin to the pin guide. The poppet assembly is movable relative to the valve body between a closed position and an open position, where at the closed position the o-ring seal seals with an interior surface of the valve body and prevents flow through the flow passageway, and at the open position flow through the flow passageway is permitted.

In yet another embodiment, a poppet assembly is described herein that is configured for use in a service connection valve. The poppet assembly includes a pin having a first end and a second end and an o-ring seal surrounding the pin between the first end of the pin and the second end of the pin. The pin has an exterior surface with: exterior threads; tool engagement flats located between the first end of the pin and the second end of the pin; a continuous circumferential shoulder located between the flats and the o-ring seal where the continuous circumferential shoulder has a diameter that is less than the first diameter of the first portion; a first circumferential channel located between the second end of the pin and the o-ring where the first circumferential channel has a first diameter; a second circumferential channel located between the first circumferential channel and the continuous circumferential shoulder, where the o-ring seal is disposed in the second circumferential channel, and the second circumferential channel has a second diameter that is greater than the first diameter of the first circumferential channel; and a lip located between the first circumferential channel and the second circumferential channel where the lip has a diameter that is greater than the second diameter of the second circumferential channel.

DRAWINGS

DETAILED DESCRIPTION

Figure 1:
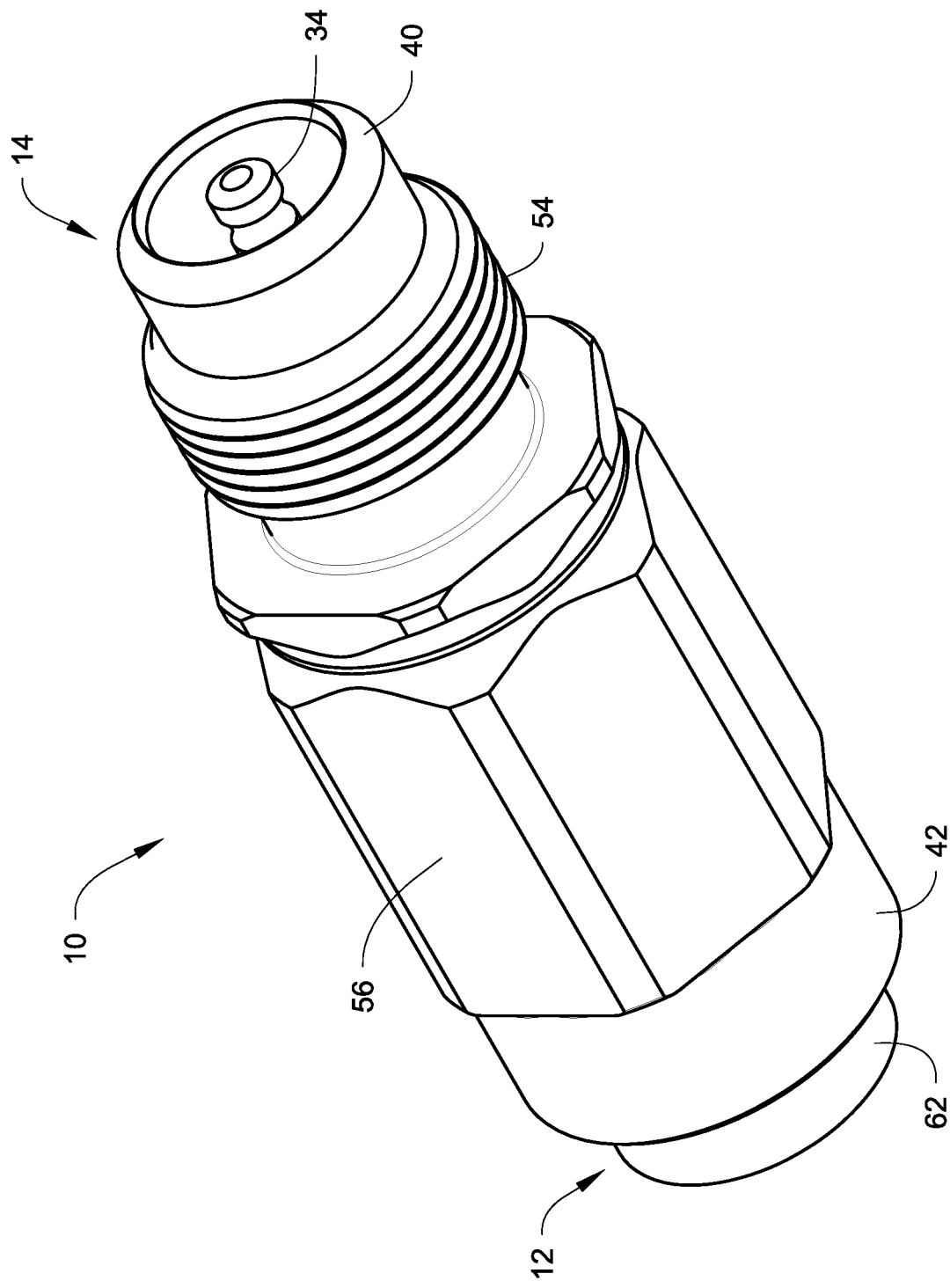
FIG. 1 is a perspective view of one embodiment of a service connection valve described herein.

With reference to FIG. 1, an embodiment of a service connection valve 10 described herein is illustrated. The service connection valve 10 described herein encompasses valves of the type described herein which permit charging, evacuation, and/or testing of a system. The service connection valve 10 has particular use in connection with refrigeration and air conditioning systems to permit charging, evacuation, and/or testing of the refrigeration and air conditioning systems. However, the service connection valve 10 can be used in connection with other systems as well. The service connection valve 10 has an end 12 that is brazed or otherwise attached to the system it is to be used with, for example to the end of a copper tube of a refrigeration system or to a service valve block. The service connection valve 10 also has an end 14 opposite the end 12 which is configured to be engaged by a servicing tool (not shown) when processing takes place through the service connection valve 10. Examples of servicing tools that can be used to engage with the end 14 of the service connection valve 10 are described in U.S. Pat. No. 6,901,947 the entire contents of which are incorporated herein by reference.

Figure 2:
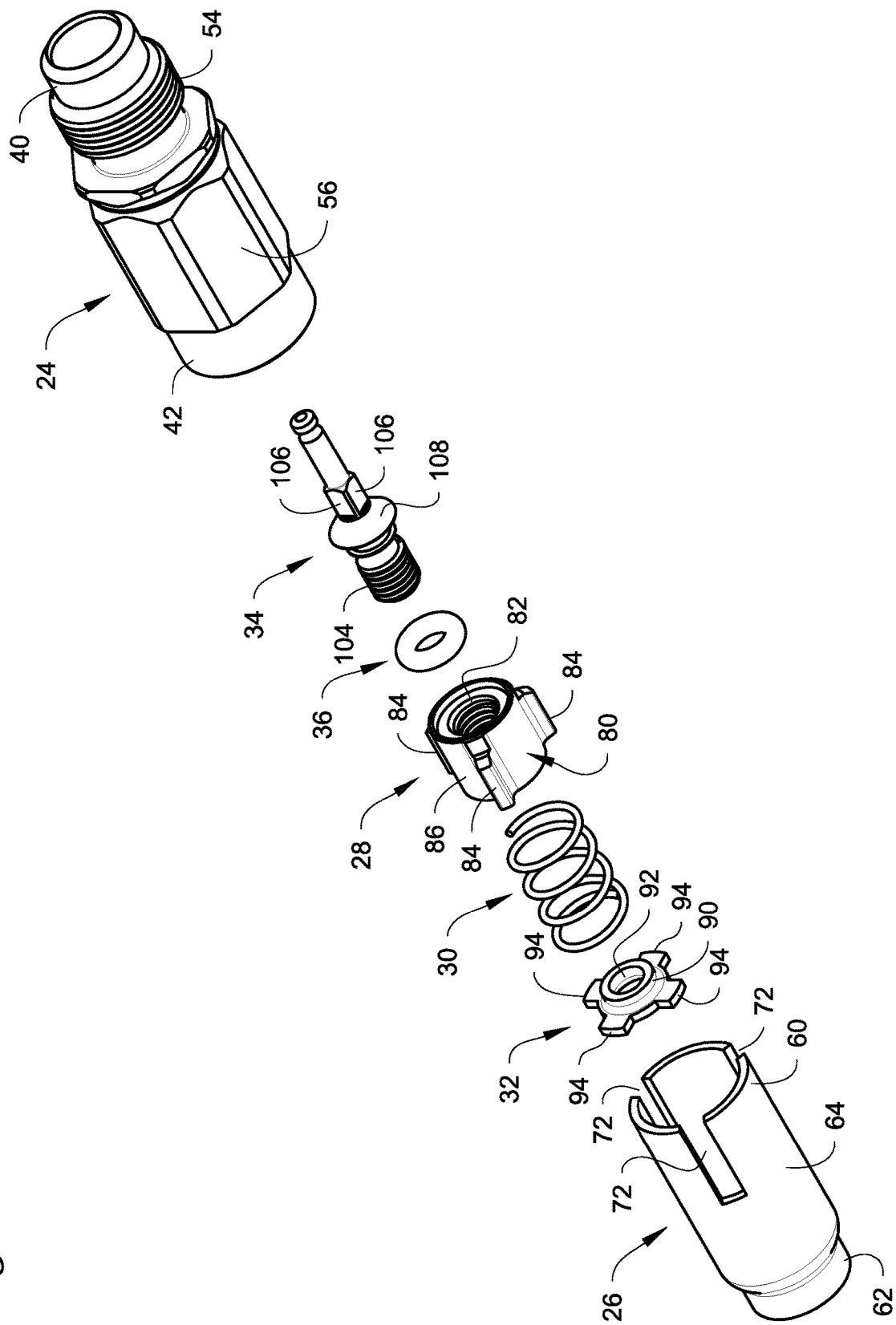
FIG. 2 is an exploded view of the service connection valve of FIG. 1 showing its various parts.
Figure 3:
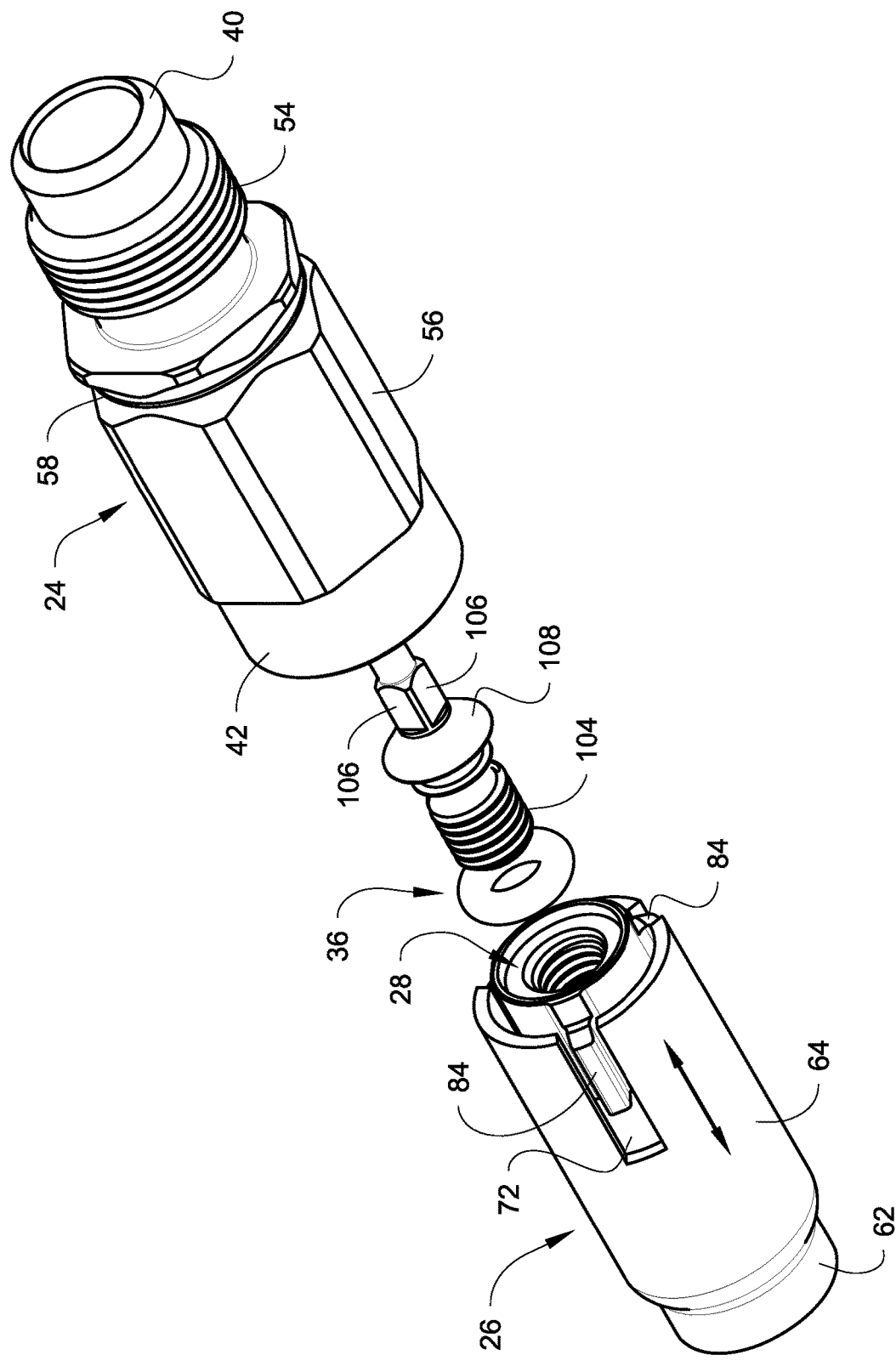
FIG. 3 is a partially assembled exploded view of the service connection valve of FIG. 1.
Figure 4:
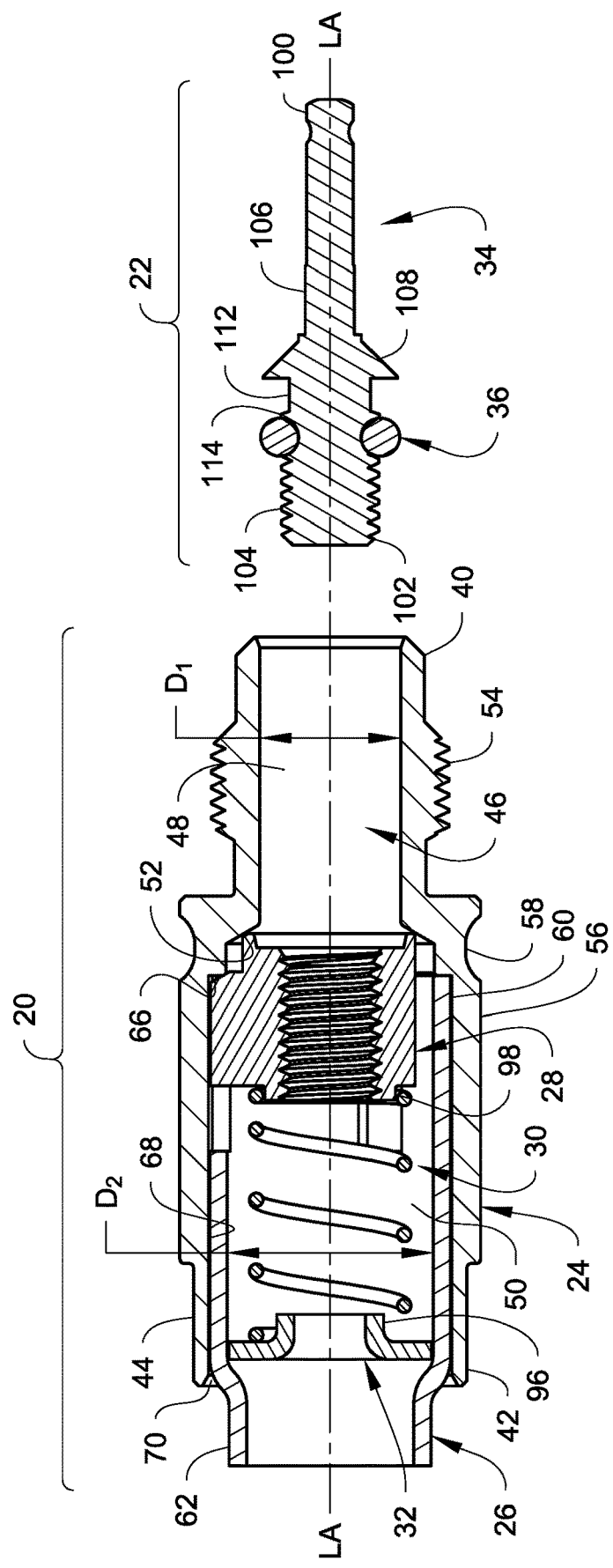
FIG. 4 is a cross-sectional view of the valve body assembly of the service connection valve of FIG. 1 prior to installation of the poppet assembly.

Referring to FIGS. 1-4, the service connection valve 10 is a generally cylindrical construction that includes a generally cylindrical valve body assembly 20 and a poppet assembly 22 (best seen in FIG. 4). The poppet assembly 22 is removably attachable to the valve body assembly 20. When the service connection valve 10 is installed in the system it is to be used with, brazing is typically used. The poppet assembly 22 can be removed from the valve body assembly 20 during the brazing since the heat of the brazing may melt or otherwise damage an o-ring seal that is part of the poppet assembly 22. Once the brazing is complete and the heat reduced sufficiently, the poppet assembly 22 can then be installed in the valve body assembly 20. In one embodiment, the poppet assembly 22 and the valve body assembly 20 can be provided already separated from one another prior to the installation. However, if a material for the o-ring seal can be developed that can withstand the heat of the brazing or if the connection of the service connection valve 10 to the system can be conducted at sufficiently low heat to avoid damaging the o-ring, the poppet assembly 22 may not need to be removed from the valve body assembly 20 during installation.

Referring to FIGS. 2-4, the valve body assembly 20 includes a valve body 24, an insert 26 installed in the valve body 24, a pin guide 28, a spring 30, and a spring washer 32. The poppet assembly 22 includes a pin 34 and an o-ring seal 36.

Referring primarily to FIG. 4 along with FIGS. 2-3, the valve body 24, which can be made of a metal material such as brass, is generally cylindrical and tubular in construction and has a first end 40, a second end 42, an exterior surface 44, and a flow passageway 46 extending centrally and longitudinally along a longitudinal axis LA through the valve body 24 from the first end 40 to the second end 42. The flow passageway 46 has a first portion 48 and a second portion 50. In the illustrated example, the first portion 48 extends from the first end 40 toward the second end 42 where the first portion 48 ultimately transitions to the second portion 50 at a transition zone 52. The first portion 48 has a first diameter $D_1$ and the second portion 50 has a second diameter $D_2$ where the second diameter $D_2$ is larger than the first diameter $D_1$. In the illustrated example, the first diameter $D_1$ is substantially constant from the first end 40 up to the transition zone 52. Similarly, the second diameter $D_2$ is substantially constant from the transition zone 52 to near the second end 42. The transition zone 52 forms a valve seat against which the o-ring seal 36 of the poppet assembly 22 seals to prevent flow through the flow passageway 46.

As best seen in FIGS. 2-4, threads 54 are formed on the exterior surface 44. The threads 54 are configured to engage with a cap (not shown) that can be attached to close the open first end 40 of the service connection valve 10, and in some embodiments the threads 54 may be engaged by a servicing tool when processing through the valve 10. The use of caps to close a service connection valve are disclosed in U.S. Pat. Nos. 6,050,295 and 6,901,947, and U.S. Patent Application Publication No. 2002/066487 each of which is incorporated herein by reference in its entirety. The threads 54 surround the first portion 48 of the flow passageway 46 and the threads 54 are positioned closer to the first end 40 than they are to the second end 42.

In addition, a hex head 56 is formed on the exterior surface 44 between the threads 54 and the second end 42. The hex head 56 is engageable by the servicing tool when processing through the valve 10. The hex head 56 is longer than the hex heads disclosed in U.S. Pat. Nos. 6,050,295 and 6,901,947, and U.S. Patent Application Publication No. 2002/066487. In the illustrated example, the hex head 56 extends from at least proximate a first end 60 of the insert 26 and toward a second end 62 of the insert 26, extends over the entire length of the pin guide 28, extends over at least a portion of the spring 30 including a forward end thereof, and extends over at least a part of the second portion 50 of the flow passageway 46. The hex head 56 acts as a heat sink to help to limit heat traveling up the valve body 24. When the valve 10 is brazed into place, the second end 42 of the valve body, which is thinner than the hex head 56, will rapidly take the heat for a quick braze and the thicker hex head 56 will absorb more energy/resist the heat travelling toward the first end 40.

The valve body 24 further includes a circumferential groove 58 formed in the hex head 56. The groove 58 facilitates gripping of the valve body 24 by a servicing tool (or manually by a user's fingers/hand) with or without using the threads 54.

Referring to FIGS. 2 and 4, the insert 26, which can be made of a metal material such as brass, is generally cylindrical and tubular in construction. The insert 26 has the first end 60, the second end 62, and an exterior surface 64. The insert 26 is inserted into the second end 42 of the valve body 24 so that the first end 60 abuts against an interior shoulder 66 of the valve body 24 near the transition zone 52. In addition, the insert 26 is sized such that the exterior surface 64 is in intimate contact with an interior surface 68 of the valve body 24. In the illustrated example, the second end 62 also projects beyond the second end 42 of the valve body 24. Once the insert 26 is inserted, the insert 26 and the second end 42 are secured together at a region 70 by swaging the second end 42 or by brazing. Further, once the insert 26 is inserted, the insert 26 forms the second portion 50 of the flow passageway 46.

As best seen in FIG. 2, the insert 26 includes a plurality of slots 72 that extend from the first end 60 toward the second end 62. In the illustrated example, three of the slots 72 are illustrated. However, a larger or smaller number of the slots 72 can be provided as long as the function(s) of the insert 26 can be performed. As discussed in further detail below, the slots 72 receive stand-off arms on the pin guide 28 to allow the pin guide 28 to move along the longitudinal axis LA relative to the valve body 24 while preventing rotation of the pin guide 28 so that the pin guide 28 is non-rotationally movable relative to the valve body 24 in a longitudinal direction.

Referring to FIGS. 2-4, the pin guide 28 is configured to detachably connect to the poppet assembly 22 and hold the pin 34 centered along the longitudinal axis LA. The pin guide 28 includes a cylindrical guide body 80 that has a central opening 82 extending completely or partially there-through, and a plurality of circumferentially spaced stand-off arms 84 projecting from an outer surface 86 of the cylindrical guide body 80. The central opening 82 is configured to detachably connect to an end of the pin 34 of the poppet assembly 22. In the illustrated embodiment, the central opening 82 can be threaded to engage with threads on the end of the pin 34. However, other forms of detachable connection between the central opening 82 and the pin 34 can be used. In the illustrated embodiment, the stand-off arms 84 project radially from the outer surface 86. However, the arms 84 can project at any angle as long as the arms 84 can perform the functions of the arms 84 described herein.

The pin guide 28 is disposed within the insert 26 within the second portion 50 of the flow passageway 46. In prior service connection valves, the pin guides are disposed in the portion of the flow passageway that extends from the front end of the valve which typically has a smaller diameter and therefore can accommodate less fluid flow. However, by locating the pin guide 28 in the second portion 50 of the flow passageway 46, a larger volume of flow can flow past the pin guide 28 at any moment in time, thereby increasing the flow rate of the valve 10. In the illustrated embodiment, the entire pin guide 28 is disposed within the second portion 50, and no portion thereof extends into the first portion 48.

As mentioned above, the arms 84 are received in the slots 72 of the insert 26 as best seen in FIG. 3. This permits the pin guide 28 to move along the longitudinal axis LA (FIG. 4) relative to the valve body 24 until the arms 84 abut against the ends of the slots 72, while at the same time preventing rotation of the pin guide 28. In addition, the spacing between the arms 84 permits fluid to flow past the pin guide 28.

Referring to FIGS. 2 and 4, the spring 30 and the spring washer 32 are disposed within the insert 26 to engage with the pin guide 28 and bias the pin guide 28 toward the right in FIG. 4 into engagement with the shoulder 66. The spring washer 32 is first installed in the insert 26 and then the spring 30 is installed with one end abutting against the spring washer 32 and the other end of the spring 30 abutting against the pin guide 28. However, other forms of resilient bias acting on the pin guide 28 can be used.

As best seen in FIG. 2, the spring washer 32 includes a body 90 having a central opening 92 on the longitudinal axis LA and a plurality of circumferentially spaced tabs 94 projecting from the body 90. The tabs 94 help to center the spring washer 32 in the insert 26. In addition, the spacing between the tabs 94 and the central opening 92 permit fluid to flow past the spring washer 32. Referring to FIG. 4, one end of the spring 30 is held in place and kept centered by an axially extending flange 96 surrounding the central opening 92, while the other end of the spring is held in place and kept centered by an axially extending flange 98 on the pin guide 28.

Referring to FIG. 4, the valve body assembly 20 has a construction whereby the pin guide 28 is already internal to the valve 10 prior to installation of the poppet assembly 22. Again, this construction differs from prior service connection valves where the pin guide is part of the poppet assembly and is installed with the poppet assembly into the valve. Further, unlike prior service connection valves, the pin guide 28 in the valve 10 is non-rotatably mounted within the valve 10, and the pin guide 28 is mounted in a manner to permit the pin guide 28 to move axially or longitudinally during operation of the valve along with the pin 34.

The poppet assembly 22 is configured to be installed into the valve body assembly 20 after the valve body assembly 20 has been secured, for example by brazing or the like, to the intended refrigeration or air conditioning system. In addition, the poppet assembly 22 is configured so that the o-ring seal 36 expands in diameter during installation of the poppet assembly 22 to create the intended sealing characteristics of the o-ring seal 36.

Figure 5:
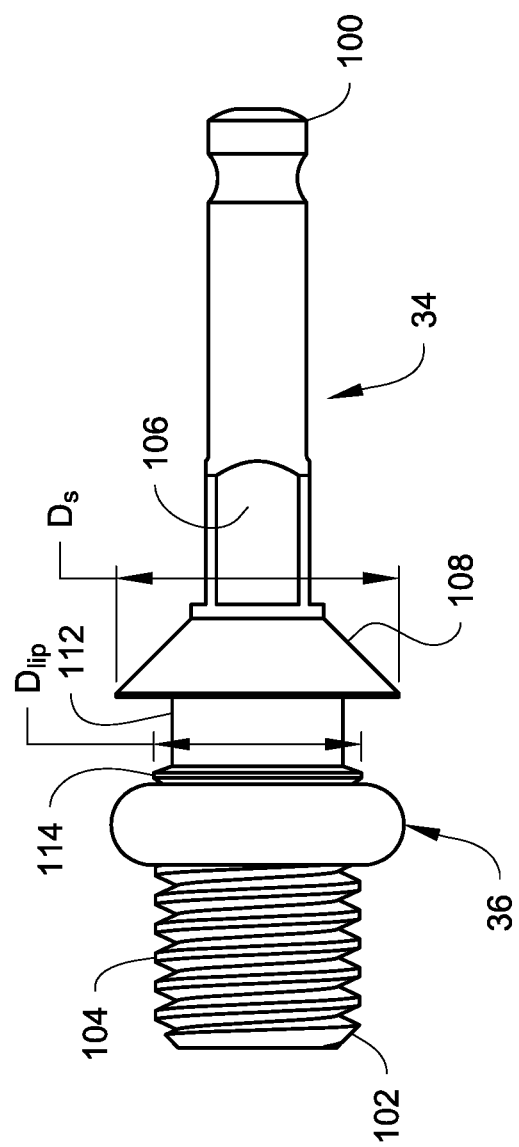
FIG. 5 is a detailed side view of the poppet assembly.

Referring to FIGS. 4 and 5, the pin 34 has a first end 100 and a second end 102, and the o-ring seal 36 surrounds the pin 34 between the first end 100 and the second end 102. The pin 34 has means for detachably connecting the pin 34 to the pin guide 28. In the illustrated example, the means for detachably connecting comprises threads 104 at the second end 102 that are configured to allow the second end 102 of the pin 34 to thread into the central opening 82 of the pin guide 28 to detachably connect the pin 34 to the pin guide 28. However, forms of detachable connection other than threads can be used, such as a detent shoulder and groove, latch, and the like, as long as the pin 34 can be detachably connected to the pin guide 28.

The pin 34 further has an exterior surface with one or more tool engagement flats 106 located between the first end 100 and the second end 102. The flat(s) 106 permit a tool to engage the pin 34 and rotate the pin 34 to thread the pin 34 into engagement with the pin guide 28 or otherwise secure the pin 34 to the pin guide 28. In addition, a continuous circumferential shoulder 108 is formed on the exterior surface of the pin 34 between the flat(s) 106 and the o-ring seal 36. The shoulder 108 has a diameter $D_s$ that is less than the first diameter $D_1$ of the first portion 48 of the flow passageway 46. This permits the poppet assembly 22 to be installed through the first end 40 of the valve body 24 as illustrated in FIG. 6.

Figure 6:
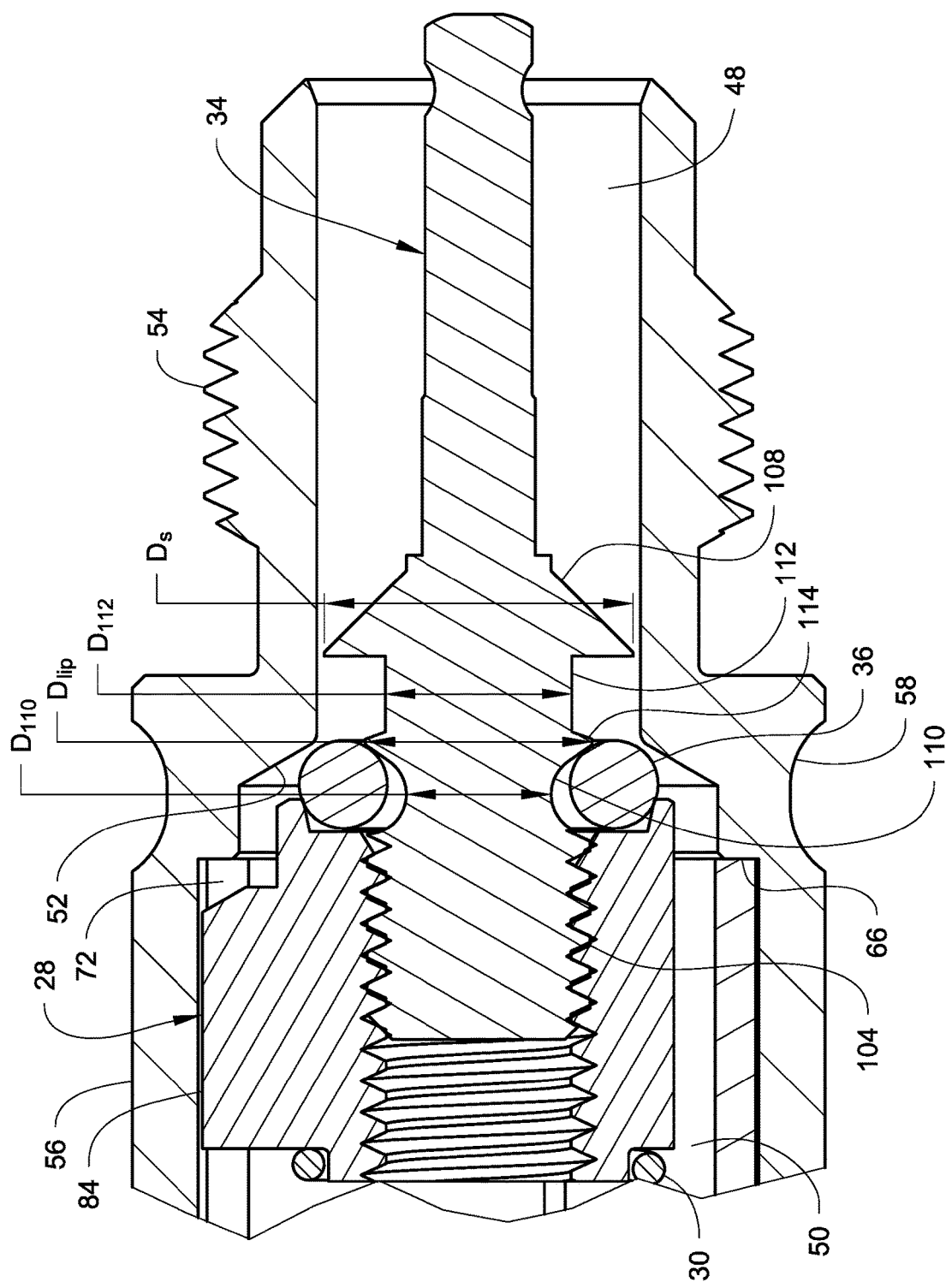
FIG. 6 is a partial cross-sectional view of the valve body assembly during installation of the poppet assembly.

With continued reference to FIGS. 4 and 5 along with FIG. 6, a first circumferential channel 110 is defined on the exterior surface of the pin 34. A second circumferential channel 112 is also defined on the exterior surface of the pin 34, and a lip 114 is defined on the exterior surface of the pin 34 between the first channel 110 and the second channel 112. The channels 110, 112 are located between the second end 102 of the pin 34 and the shoulder 108. In addition, the channel 112 is located between the channel 110 and the continuous circumferential shoulder 108. Further, once the poppet assembly 22 is fully installed, the channel 110 is located between the second end 102 of the pin 34 and the seal 36. However, as illustrated in FIGS. 4-6, prior to installation of the poppet assembly and at least during a portion of the installation, the o-ring seal 36 is disposed in the channel 110.

Referring to FIG. 6, the first circumferential channel 110 has a first diameter $D_{110}$ and the second circumferential channel 112 has a second diameter $D_{112}$ that is larger than the first diameter $D_{110}$. In addition, the lip 114 has a diameter $D_{lip}$ that is greater than the second diameter $D_{112}$ of the second circumferential channel.

Figure 7:
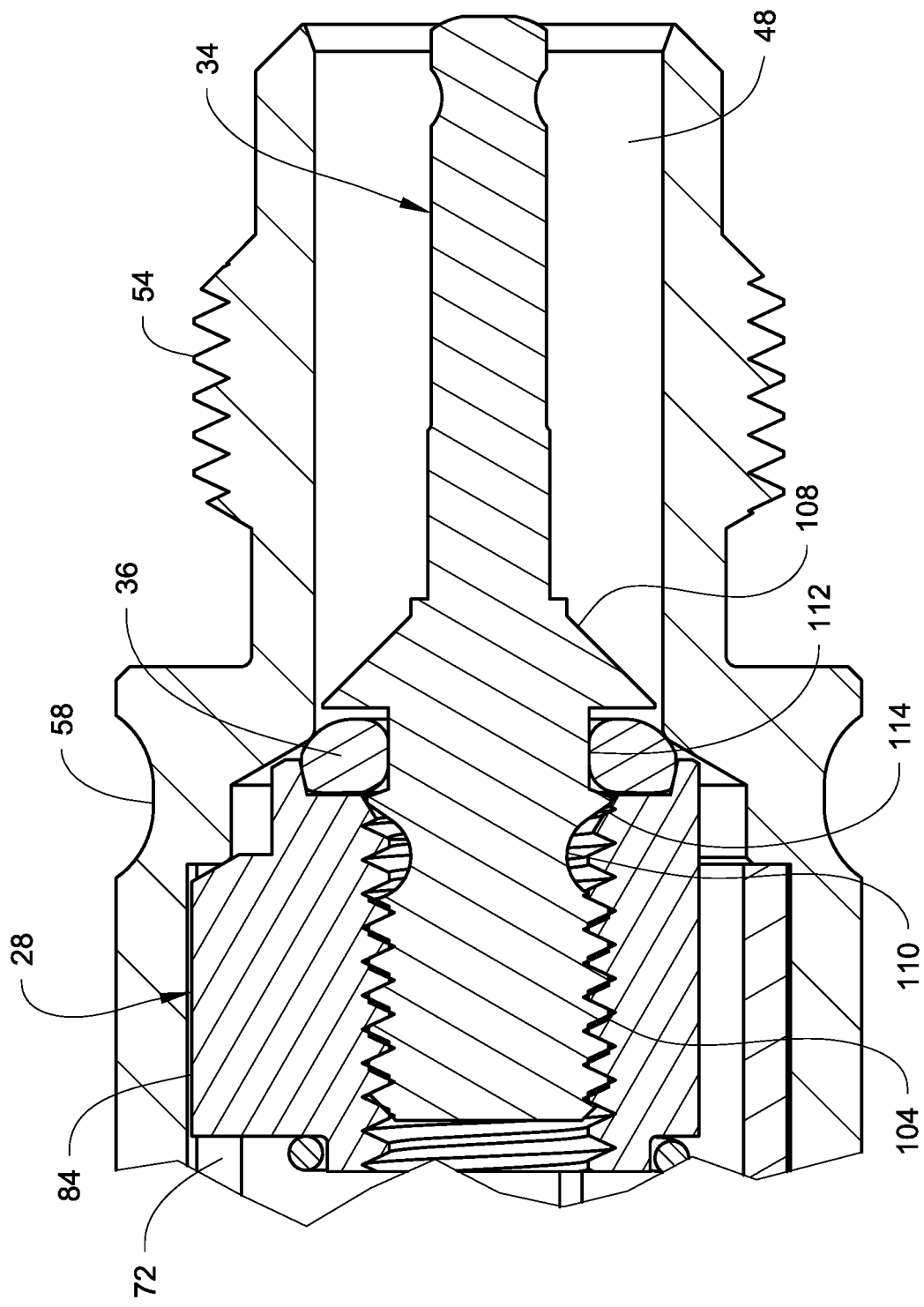
FIG. 7 is a partial cross-sectional view of the valve body assembly upon full installation of the poppet assembly.

As shown in FIGS. 4-6, the seal 36 is initially disposed in the channel 110 where the diameter $D_{110}$ is such that the seal 36 does not interfere with the interior wall of the valve body 24 that defines the first portion 48, i.e. when the seal 36 is in the channel 110, the outer diameter of the seal 36 is slightly less than the diameter $D_1$ of the first portion 48. This permits the seal 36 to clear the interior wall during installation through the end 40. The poppet assembly 22 is inserted through the first end 40 of the valve body 24 using a suitable insertion tool, such as one of the tools disclosed in U.S. Pat. No. 6,901,947. The end 102 of the pin 34 is then threaded into the central opening 82 of the pin guide 28. As the pin 34 threads into the pin guide 28, the seal 36 will engage with the end of the pin guide 28 as shown in FIG. 6. This engagement pushes the seal 36 out of the channel 110, over the lip 114 and ultimately into the channel 112 as depicted in FIG. 7. The shoulder 108 and the end of the pin guide 28 effectively encapsulate the seal 36 and form a channel for the seal 36. In addition, the lip 114 wedges into the central opening 82 of the pin guide 28 which helps to prevent the threads from unthreading over time during use of the valve 10. Further, the larger diameter of the second channel 112 expands the diameter of the o-ring seal 36 so that the seal 36 now seals with the interior surface of the valve body 24 at the transition zone 52.

Figure 8:
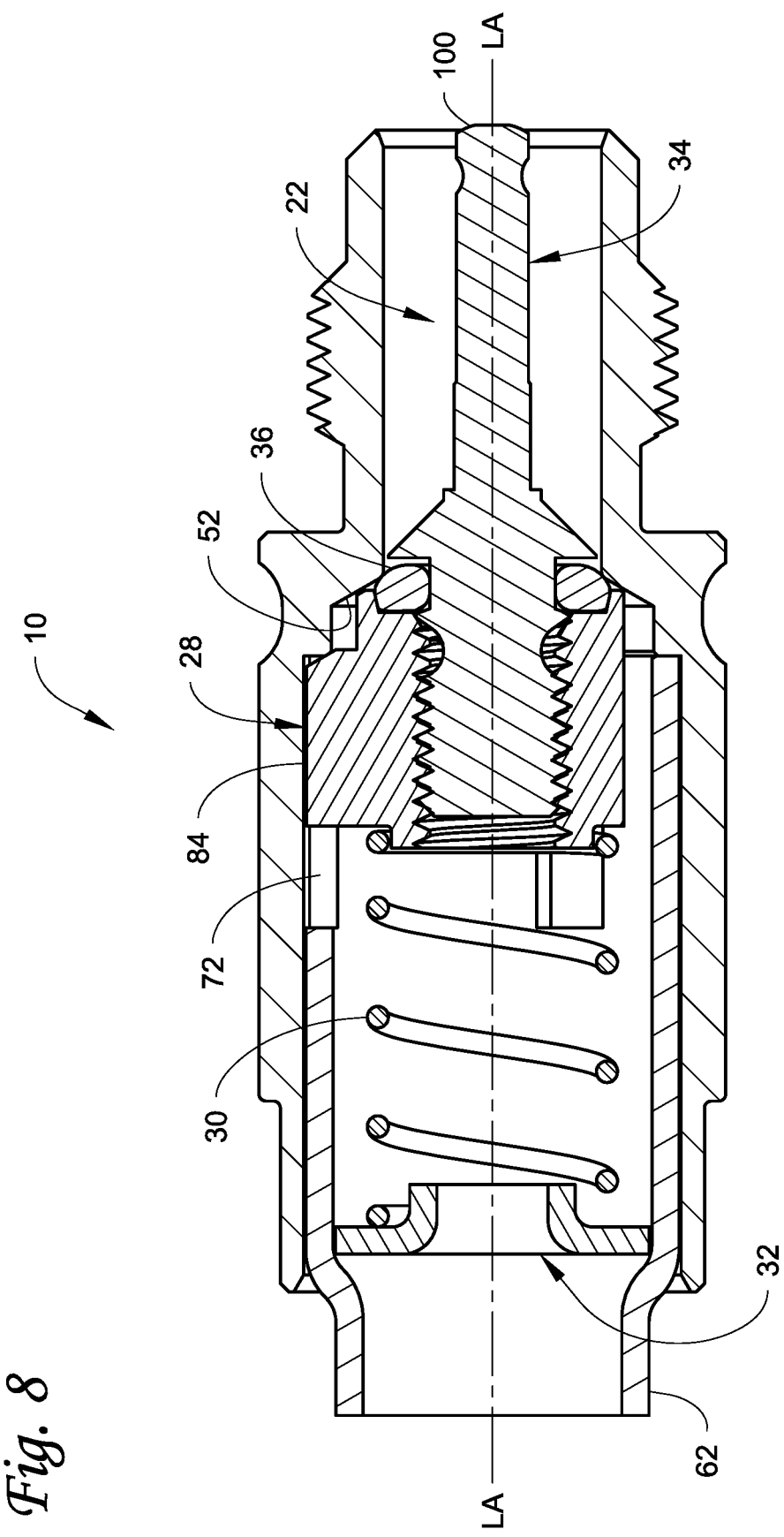
FIG. 8 is a cross-sectional view of the service connection valve with the poppet assembly in the closed position.
Figure 9:
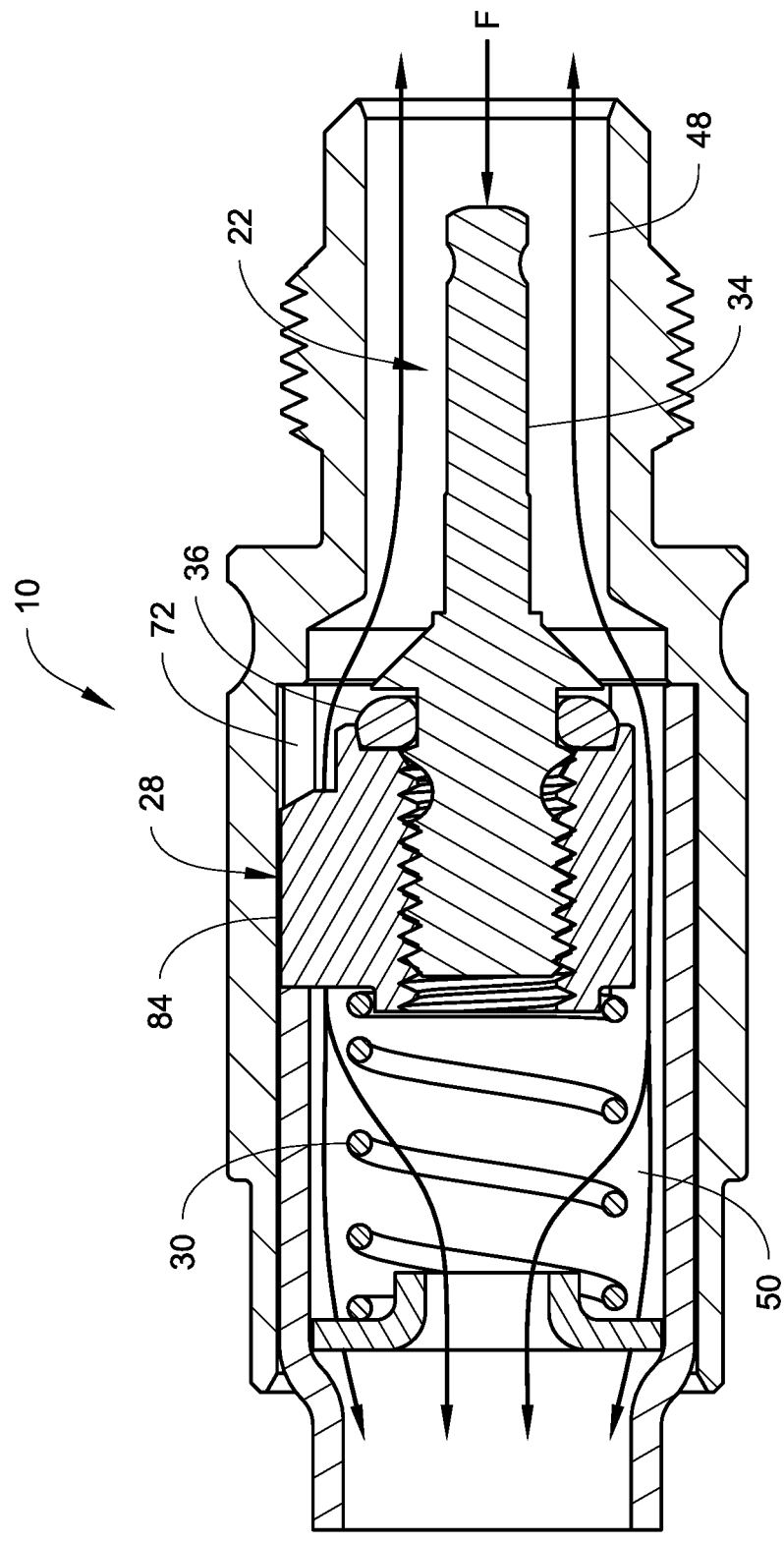
FIG. 9 is a cross-sectional view of the service connection valve with the poppet assembly in the open position.

FIGS. 8 and 9 illustrate operation of the valve. FIG. 8 illustrates the poppet assembly 22 in a closed position with the pin guide 28 forced to the right by the spring 30 and the seal 36 sealing with the interior surface of the valve body 24 at the transition zone 52. The position of the poppet assembly 22 in FIG. 8 may also be referred to as a home or default position. FIG. 9 illustrates the poppet assembly 22 in an open position allowing flow through the valve 10 during processing. A force F is axially applied to the pin 34 by a suitable servicing tool (not shown) known in the art. The pin 34 together with the pin guide 28 and the seal 36 are therefore displaced to the left in FIG. 9 against the bias of the spring 30. The displacement can occur until the ends of the arms 84 abut against the ends of the slots 72. Fluid flow (indicated by the arrows) can then occur through the valve 10, either into the system the valve 10 is attached to or from the system the valve 10 is attached to. When the force F is removed, the spring 30 then bias the pin guide 28 and the poppet assembly 22 to the right in FIG. 9 to return the poppet assembly back to the closed position.

Figure 10:
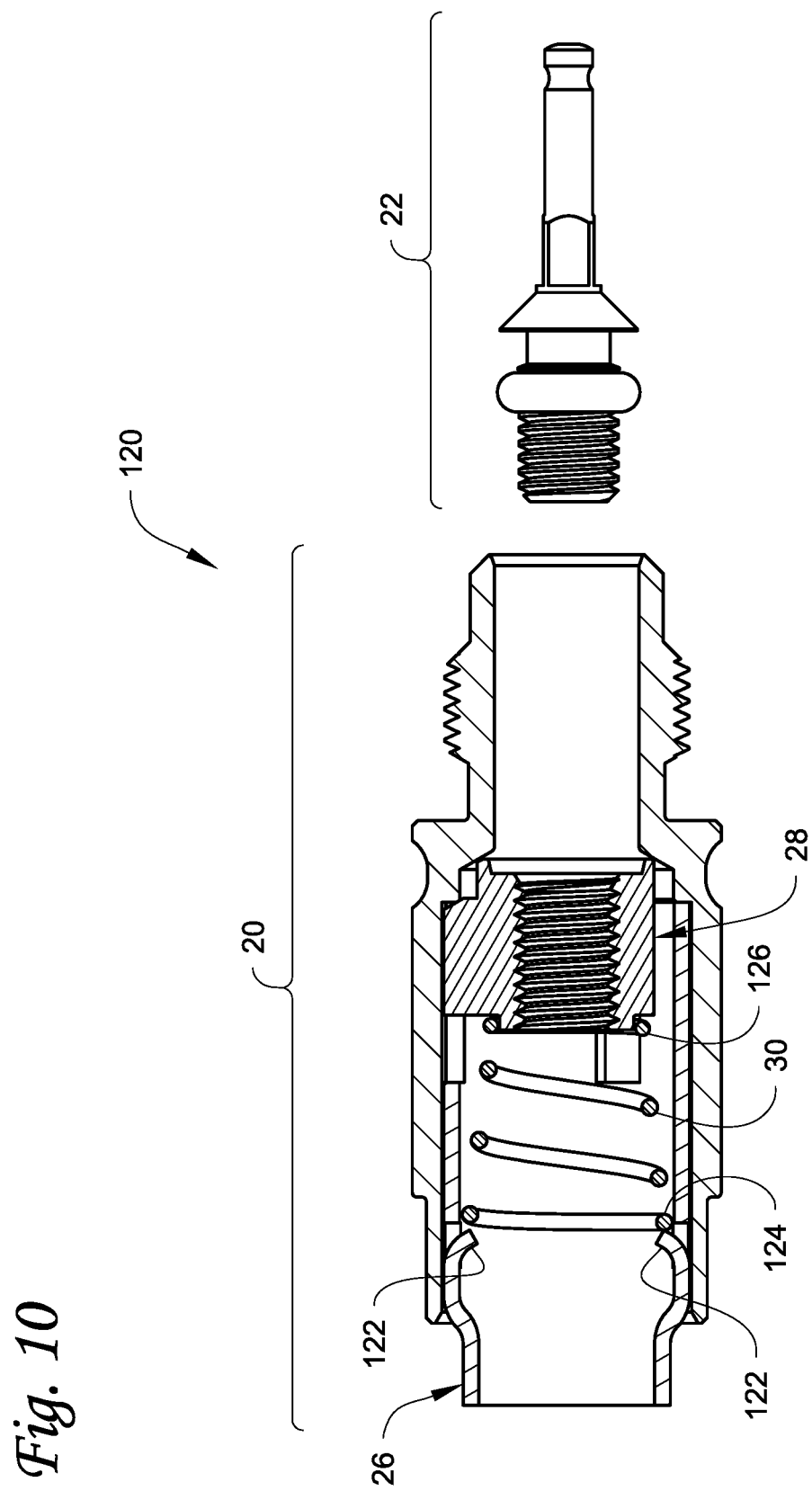
FIG. 10 is a cross-sectional view of another embodiment of a valve body assembly of a service connection valve with the poppet assembly removed.

FIG. 10 illustrates another embodiment of a service connection valve 120. In this embodiment, elements that are similar in construction or operation to elements in FIGS. 1-9 will be referenced using the same reference numerals. In the valve 120, the spring washer 32 used in FIGS. 1-9 is eliminated. Instead, the insert 26 is provided with a plurality of tabs 122 that are bent inward to support the end of the spring 30. The tabs 122 are formed on the insert 26 between the ends thereof. In addition, the spring 30 can be made conical in shape, with the end 124 thereof that abuts against the tabs 122 having a diameter that is larger than the end 126 thereof that abuts against the pin guide 28.

Figure 11:
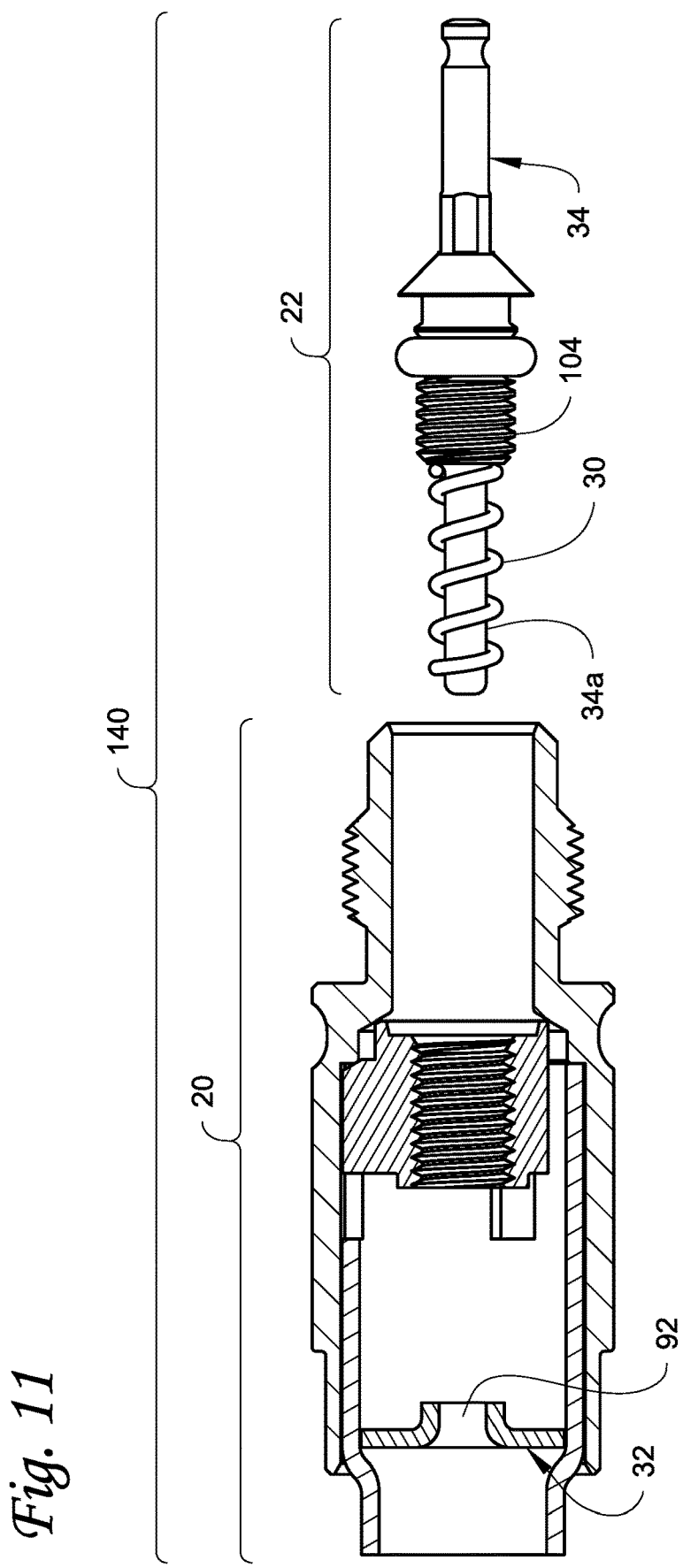
FIG. 11 is a cross-sectional view of still another embodiment of a valve body assembly of a service connection valve with the poppet assembly removed.
Figure 12:
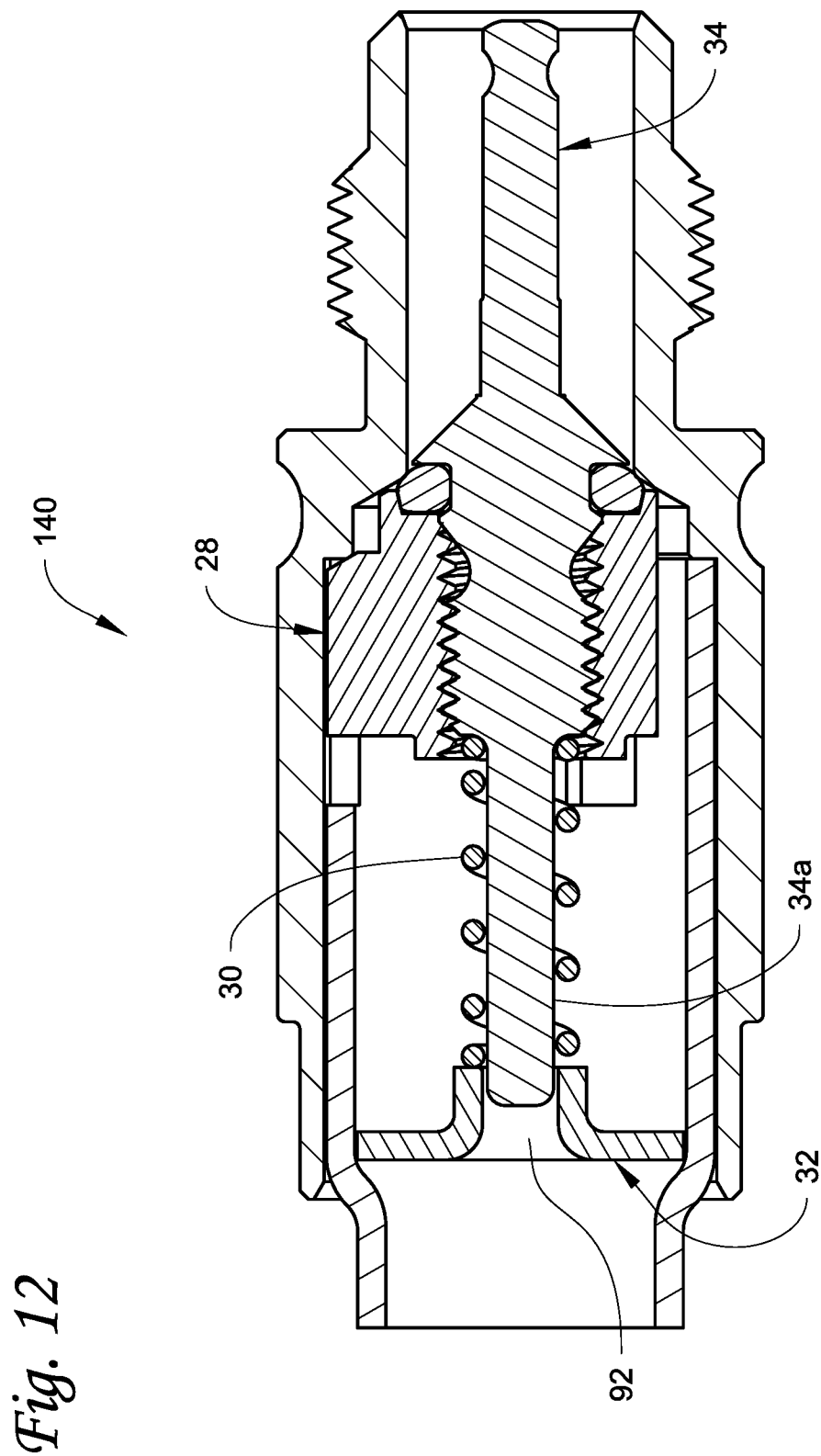
FIG. 12 is a cross-sectional view of the service connection valve of FIG. 11 with the poppet assembly installed.

FIGS. 11 and 12 illustrate another embodiment of a service connection valve 140. In this embodiment, elements that are similar in construction or operation to elements in FIGS. 1-9 will be referenced using the same reference numerals. In the valve 140, the spring 30 is part of the poppet assembly 22. A portion 34a of the pin 34 protrudes past the threads 104 and the spring 30 is disposed around the portion 34a. When the poppet assembly 22 is installed into the valve body assembly 20, the end of the portion 34a is received in the central opening 92 of the spring washer 32 as shown in FIG. 12 whereby movement of the poppet assembly is guided by the pin guide 28 as well as by the central opening 92 of the spring washer 32.

Figure 13A:
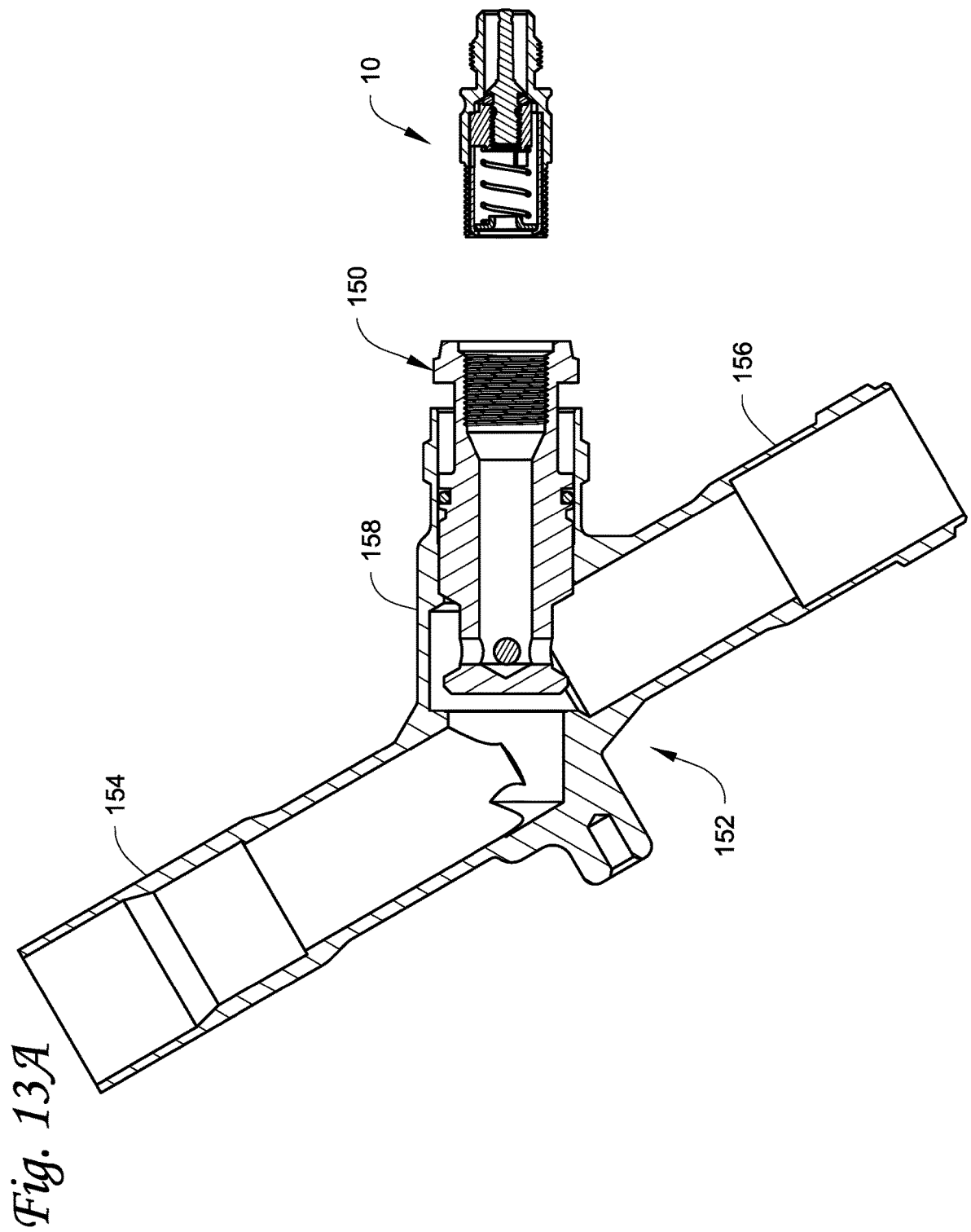
FIGS. 13A and 13B are cross-sectional views showing the service connection valve of FIG. 1 incorporated into a service valve of a service valve block, with the service connection valve removed in FIG. 13A and installed in FIG. 13B.
Figure 13B:
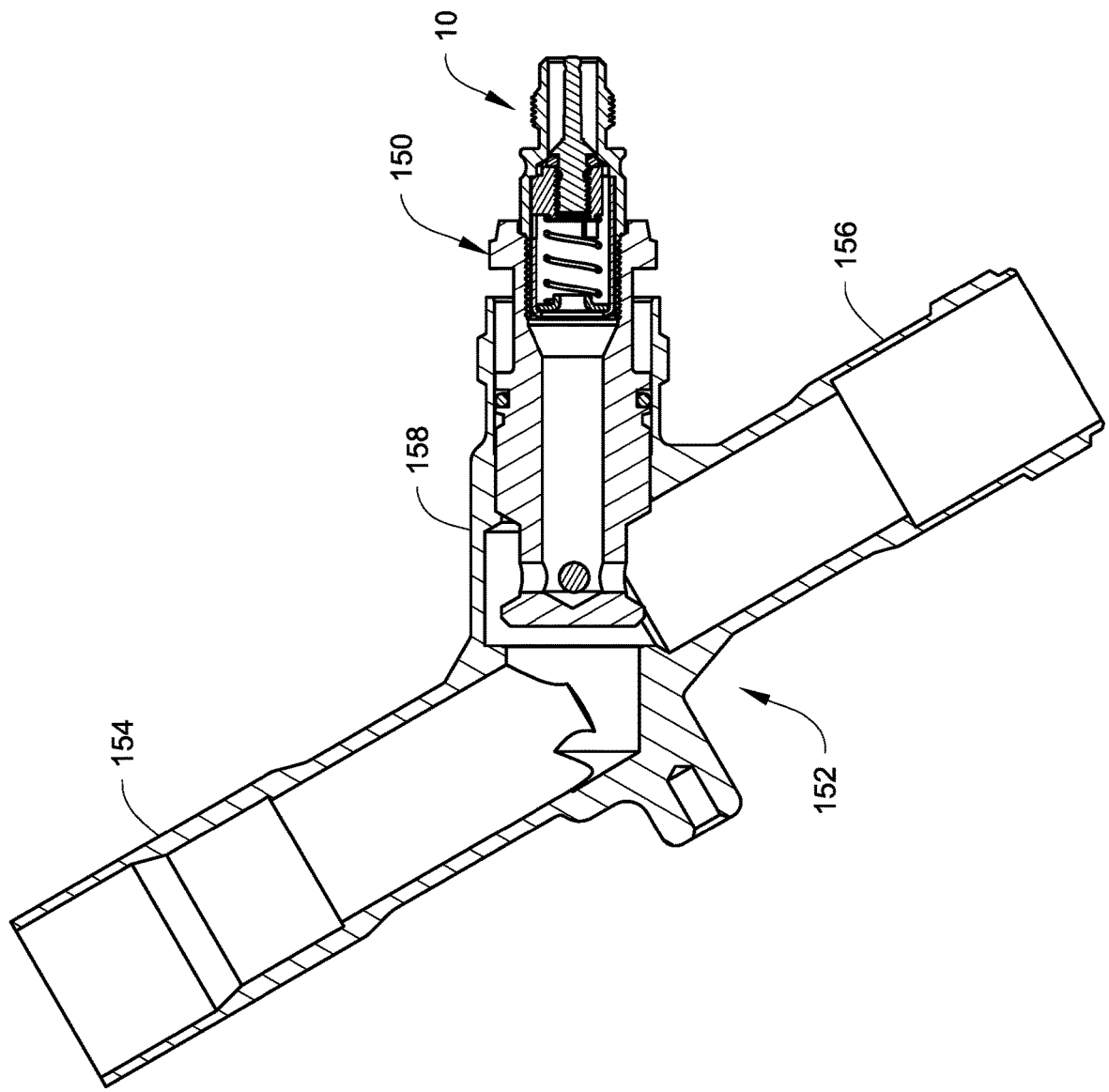

FIGS. 13A and 13B illustrate the service connection valve 10 of FIGS. 1-9 incorporated into a piston valve 150 of a service valve block 152. The service valve block 152 is used in a split system refrigeration unit that includes a condenser unit mounted in a separate location than the evaporation unit. The service valve block 152 includes a condenser side port 154 and an evaporation side port 156. The piston valve 150 is disposed in a service port 158 and can be actuated in and out relative to the service port 158 to control flow between the condenser side port 154 and the evaporation side port 156. The valve 10 can thread into the end of the piston valve 150 or otherwise be secured to the piston valve 150. For maintenance of the refrigeration system, processing of fluid into and from the system can occur through the service connection valve 10. Further information on service valve blocks, a piston valve and a valve that works in conjunction with the piston valve is disclosed in U.S. Pat. No. 8,695,642 the entire contents of which are incorporated herein by reference.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A service connection valve, comprising:
   a generally cylindrical valve body having a first end, a second end, an exterior surface, and a flow passageway extending centrally and longitudinally through the valve body from the first end to the second end;
   the flow passageway has a first portion and a second portion, the first portion extending from the first end toward the second end, and the first portion has a first diameter;
   the second portion has a second diameter that is larger than the first diameter;
   a pin guide disposed within the second portion of the flow passageway, the pin guide is mounted so as to be non-rotationally movable relative to the valve body in a longitudinal direction;
   the pin guide includes a cylindrical guide body, a central threaded opening, and a plurality of circumferentially spaced stand-off arms projecting from an outer surface of the cylindrical guide body;
   threads formed on the exterior surface, the threads surround the first portion and the threads are positioned closer to the first end than to the second end; and
   a hex head formed on the exterior surface between the threads and the second end.

2. A service connection valve, comprising:
   a generally cylindrical valve body having a first end, a second end, an exterior surface, and a flow passageway extending centrally and longitudinally through the valve body from the first end to the second end;

the flow passageway has a first portion and a second portion, the first portion extending from the first end toward the second end, and the first portion has a first diameter;

the second portion has a second diameter that is larger than the first diameter;

a pin guide disposed within the second portion of the flow passageway, the pin guide is mounted so as to be non-rotationally movable relative to the valve body in a longitudinal direction;

threads formed on the exterior surface, the threads surround the first portion and the threads are positioned closer to the first end than to the second end;

a hex head formed on the exterior surface between the threads and the second end;

a poppet assembly detachably connected to the pin guide, the poppet assembly comprises a pin having a first end and a second end and an o-ring seal surrounding the pin between the first end of the pin and the second end of the pin; the pin having threads that detachably connect the pin to the pin guide.

3. The service connection valve of claim 2, wherein the pin has an exterior surface with tool engagement flats located between the first end of the pin and the second end of the pin; a continuous circumferential shoulder on the exterior surface of the pin located between the flats and the o-ring seal, the continuous circumferential shoulder has a diameter that is less than the first diameter of the first portion; a first circumferential channel defined on the exterior surface of the pin located between the second end of the pin and the continuous circumferential shoulder, the first circumferential channel having a first diameter; and a second circumferential channel defined on the exterior surface of the pin located between the first circumferential channel and the continuous circumferential shoulder, the o-ring seal being disposed in the second circumferential channel, and the second circumferential channel having a second diameter that is greater than the first diameter of the first circumferential channel; a lip defined on the exterior surface of the pin located between the first circumferential channel and the second circumferential channel, the lip having a diameter that is greater than the second diameter of the second circumferential channel.

4. The service connection valve of claim 2, wherein the hex head is positioned on the valve body and has a length whereby the hex head extends over an entire length of the pin guide, and the hex head overlaps at least a portion of the second portion of the flow passageway.

5. A service connection valve, comprising:
a generally cylindrical valve body having a first end, a second end, an exterior surface, and a flow passageway extending centrally and longitudinally through the valve body from the first end to the second end;

a pin guide disposed within the flow passageway;

a poppet assembly detachably connected to the pin guide, the poppet assembly comprises a pin having a first end and a second end and an o-ring seal surrounding the pin between the first end of the pin and the second end of the pin; the pin having threads that detachably connect the pin to the pin guide;

the poppet assembly is movable relative to the valve body between a closed position and an open position, at the closed position the o-ring seal seals with an interior surface of the valve body and prevents flow through the flow passageway, and at the open position flow through the flow passageway is permitted;

threads formed on the exterior surface, the threads surround the first portion and the threads are positioned closer to the first end than to the second end; and a hex head formed on the exterior surface between the threads and the second end.

6. The service connection valve of claim 5, wherein the pin guide is movable relative to the valve body in a longitudinal direction, and the pin guide is fixed to and moves with the poppet assembly as the poppet assembly moves between the closed position and the open position.

7. A poppet assembly configured for use in a service connection valve, comprising:
a pin having a first end and a second end and an o-ring seal surrounding the pin between the first end of the pin and the second end of the pin;

the pin having an exterior surface with exterior threads;

the exterior surface having tool engagement flats located between the first end of the pin and the second end of the pin;

a continuous circumferential shoulder on the exterior surface of the pin located between the flats and the o-ring seal, the continuous circumferential shoulder has a diameter that is less than the first diameter of the first portion;

a first circumferential channel defined on the exterior surface of the pin located between the second end of the pin and the continuous circumferential shoulder, the first circumferential channel having a first diameter;

a second circumferential channel defined on the exterior surface of the pin located between the first circumferential channel and the continuous circumferential shoulder, the o-ring seal being disposed in the second circumferential channel, and the second circumferential channel having a second diameter that is greater than the first diameter of the first circumferential channel; and a lip defined on the exterior surface of the pin located between the first circumferential channel and the second circumferential channel, the lip having a diameter that is greater than the second diameter of the second circumferential channel.

* * * * *